United States Patent [19] [11] 3,898,242
Lorenz et al. [45] Aug. 5, 1975

[54] O,O-DIALKYL-O-NAPHTHISOXAZOLE-THIONOPHOSPHORIC ACID ESTERS

[75] Inventors: Walter Lorenz, Wuppertal; Ingeborg Hammann; Wolfgang Behrenz, both of Cologne; Wilhelm Stendel, Wuppertal, all of Germany

[73] Assignee: Bayer Aktiengesellschaft, Leverkusen, Germany

[22] Filed: Apr. 6, 1973

[21] Appl. No.: 348,794

[30] Foreign Application Priority Data
Apr. 14, 1972 Germany............ 2218102

[52] U.S. Cl............................ 260/307 D; 424/200
[51] Int. Cl............................................. C07d 85/48
[58] Field of Search........................... 260/307 D

[56] References Cited
UNITED STATES PATENTS
3,232,951  2/1966  Lorenz et al................ 260/304

Primary Examiner—Donald G. Daus
Assistant Examiner—Raymond V. Rush
Attorney, Agent, or Firm—Burgess, Dinklage & Sprung

[57] ABSTRACT

O,O-dialkyl-O-naphthisoxazole-thionophosphoric acid esters of the general formula

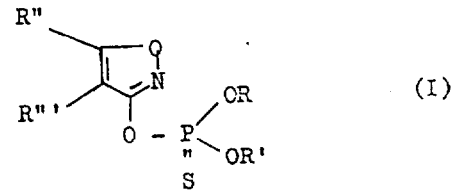

in which
R and R' each independently is alkyl of 1 to 6 carbon atoms, and
R'' and R''', together with the adjacent members of the isoxazole ring, form a naphthalene radical,
which possess insecticidal and acaricidal properties.

4 Claims, No Drawings

O,O-DIALKYL-O-NAPHTHISOXAZOLE-THIONOPHOSPHORIC ACID ESTERS

The present invention relates to and has for its objects the provision of particular new O,O-dialkyl-O-naphthisoxazole-thionophosphoric acid esters which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specifications DOS Nos. 2,031,750 and 2,040,410 that benzisoxazole-thionophosphoric acid esters, for example the O,O-dimethyl- (Compound A) and O,O-diethyl-0-benzisoxazol(3)yl]- (Compound B) or O,O-dimethyl-O-[5-methylbenzisoxazol-(3)yl]-(Compound C) or O,O-diethyl-O-[5-tert.-butyl-benzisoxazol(3)yl]-thionophosphoric acid ester (Compound D), possess insecticidal and acaricidal activity.

The present invention provides naphthisoxazole-thionophosphoric acid esters of the general formula

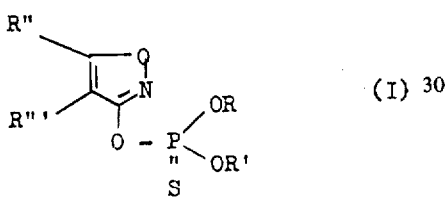

in which
R and R' each independently is alkyl of 1 to 6 carbon atoms, and
R'' and R''', together with the adjacent members of the isoxazole ring, form a naphthalene radical.

Preferably, R and R' each independently is lower alkyl of 1 to 4 carbon atoms, and R'' and R''' form a naphthalene ring which is linked to the isoxazole radical in the 1,2-d, 2,1-d or 2,3-d position.

Surprisingly, the naphthisoxazole-thionophosphoric acid esters according to the invention display a better insecticidal and acaricidal action, in particular against hygiene pests and pests of stored products, than the previously known compounds of analogous structure and similar type of action. The compounds may be employed with especial success in the veterinary field against animal parasites (ectoparasites), such as parasitic fly larvae.

Thus the compounds according to the invention represent a genuine enrichment of the art. Furthermore the new compounds contribute towards satisfying the great demand for constantly new active compounds in the field of pesticides. The latter results from the fact that the commercially available agents have to meet constantly higher standards, particularly in respect of the protection of the environment, such as low toxicity to warm-blooded animals and low phytotoxicity, rapid degradation in and on the plant with short minimum intervals to be observed between spraying with pesticide and harvesting, and activity against resistant pests.

For example, over the course of the years blowfly larvae have in various areas become resistant to the phosphoric acid esters and carbamates hitherto employed as agents for combating them, so that they are often combated with little success.

To ensure economical raising of animals in the areas subject to attack, there is therefore a demand for agents by means of which blowfly larvae even of resistant strains, for example of the genus Lucilia, can be combated reliably. For example, the Goondiwindi strain of *Lucilia cuprina* has to a high degree become resistant to the phosphoric acid esters and carbamates hitherto employed. The active compounds according to the invention, however, are effective both against the normal sensitive strains and also against the resistant strains of blowfly larvae.

The invention also provides a process for the production of a naphthisoxazole-thionophosphoric acid ester of the formula (I) in which an O,O-dialkyl-thionophosphoric acid ester halide of the general formula

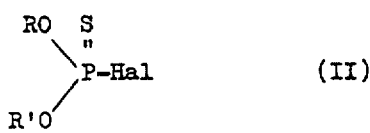

is reacted with a 3-hydroxynaphthisoxazole derivative of the formula

in the presence of an acid-binding agent or in the form of an alkali metal, alkaline earth metal or ammonium salt; in the abovementioned formulae
R,R',R'' and R''' have the abovementioned meanings and
Hal represents a halogen atom, preferably a chlorine atom.

If O,O-diethyl-thionophosphoric acid ester chloride and 3-hydroxy-naphth(2,3-d)-isoxazole are used as the starting materials, the course of the reaction can be represented by the following formula scheme:

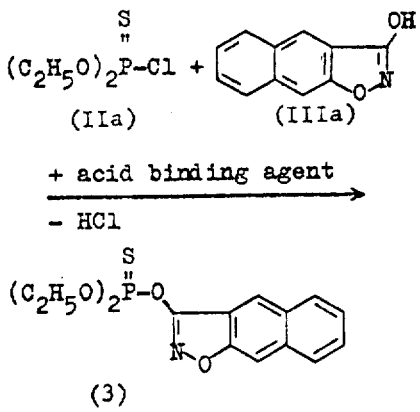

The O,O-dialkylthionophosphoric acid ester halides (II) and naphthisoxazole derivatives (III) required as starting substances are known from the literature and can be prepared according to customary methods. The following may be mentioned as examples of thionophosphoric acid ester halides which can be used in the process: O,O-dimethyl-, O,O-diethyl-, O,O-di-n-propyl-, O,O-di-isopropyl-, O,O-di-n-butyl-, O,O-di-iso-butyl-, O,O-di-tert.-butyl-, O,O-di-tert.-butyl-, O-ethyl-O-n-propyl-, O-ethyl-O-iso-propyl- and O-n-propyl-O-n-butyl-thionophosphoric 0acid ester chloride.

Possible naphthisoxazoles are: 3-hydroxy-naphth(2,3-d)-, -(1,2-d)- and -(2,1-d)-isoxazole.

The reaction is preferably carried out in the presence of a solvent or diluent. As such, practically all inert organic solvents can be used. These include, in particular, aliphatic and aromatic optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, such as acetone, methyl ethyl ketone, methyl isopropyl ketone and methyl isobutyl ketone; and nitriles, such as acetonitrile and propionitrile.

All customary acid-binding agents can be used as acid acceptors. Alkali metal carbonates and alkali metal alcoholates, such as sodium and potassium carbonate, sodium and potassium methylate and sodium and potassium ethylate, and also aliphatic, aromatic or heterocyclic amines, for example triethylamine, dimethylamine, dimethylaniline, dimethylbenzylamine and pyridine, have proved particularly suitable.

The reaction temperature can be varied over a wide range. In general, the reaction is carried out at about 10 to 100, preferably about 40° to 70°C.

The reaction is generally carried out under normal pressure.

To carry out the process, the 3-hydroxy-naphthisoxazole is in general employed in a molar excess of 10 to 30 percent. The reactants may be brought together in one of the abovementioned solvents in the presence of an acid acceptor and stirred for some hours at the elevated temperature. After cooling, the batch may be poured into water and taken up with an organic solvent, for example benzene, and the organic phase may be washed with sodium hydroxide solution, the reaction mixture then being worked up in accordance with customary methods.

The substances according to the invention are obtained in a crystalline form and can be unambiguously characterized by their melting points.

As has already been mentioned, the new products are distinguished by an excellent insecticidal, and acaricidal activity including a good long-term action against plant pests, hygiene pests and pests of stored products. They are active both against sucking and against biting insects and mites (Acarina). In addition, they display a low toxicity to warm-blooded animals and a low phytotoxicity.

As ectoparasites on animals there may be mentioned, from the class of the insects: Diptera larvae which are parasitic in warm-blooded animals, for example *Lucilia sericata, Lucilia cuprina* (sensitive and resistant strains), *Chrysomya chloropyga* and larvae of warble flies, for example, the ox warble fly *Hypoderma bovis*.

In the field of veterinary medicine, the active compounds may be applied in the customary manner, for example by powdering, spraying, watering or atomising, or as a bath (dip). At the same time, auxiliaries, extenders and/or surface-active agents, or other active compounds such as insecticides or disinfectants, can be mixed into the formulations or ready-to-use solutions.

The compounds according to the invention may be successfully employed as pesticides in plant protection, in the hygiene and stored products field and in the veterinary field.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry blackfly (*Myzus cerasi*): in addition, scales and mealybugs (*Coccina*), for example the oleander scale (*Aspidiotus hederae*) and the soft scale (*Lecanium hesperidum*) as well as the grape mealybug (*Pseudococcus maritumus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastroyphysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms, (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (Ceratitis capitata), the house fly (*Musca domestica*), the little house fly (Fannia canicularis, canicularis), the black blow fly (Phormia regina) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (*Tetranychidae*) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, aloumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protective agents, such as other insecticides and acaricides, or rodenticides, fungidides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10%, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were then infested with mustard beetle larvae (*Phaedon cochleariae*).

After the specified periods of time, the degree of destruction was determined in percent. Here, 100 percent means that all the beetle larvae were killed. 0 percent means that none of the beetle larvae were killed.

The active compounds, the concentration of the active compounds, the times of evaluation and the results can be seen from the following Table 1:

Table 1

Long-term action after spraying/0.05% by weight of active compound
(Phaedon cochleariae on Brassica oleracea)

| Active compounds | % destruction after |  |  |  |  |  |  |  |  |
|---|---|---|---|---|---|---|---|---|---|
|  | 1 | 4 | 8 | 11 | 15 | | | | days |
| 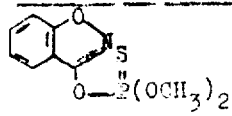 (known) (A) | 60 | 0 | | | | | | | |
| 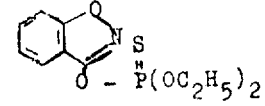 (known) (B) | 100 | 100 | 0 | | | | | | |
| 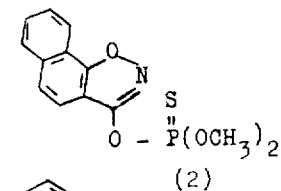 (2) | 100 | 100 | 100 | 100 | 100 | 100 | 90 | 10 | |
| 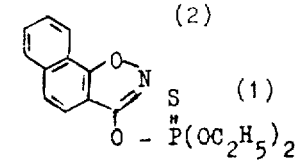 (1) | 100 | 100 | 100 | 100 | 100 | 100 | 100 | | |

The synthesis, unexpected superiority and outstanding activity of the particular new compounds of the present invention are illustrated, without limitation, by the following examples:

EXAMPLE 1

Phaedon larvae test (long-term action after spraying)
Solvent: 3 parts by weight of acetone
Emulsifier: 1 part by weight of alkylaryl polyglycol ether

EXAMPLE 2

Plutella test (long-term action after spraying)
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100 percent means that all the caterpillars were killed whereas 0 percent means that none of the caterpillars were killed.

The active compounds, the concentration of the active compounds, the evaluation times and the results can be seen from the following Table 2:

with the stated amount of solvent containing the stated amount of emulsifier and the concentrate was diluted with water to the desired concentration.

Bean plants (*Phaseolus vulgaris*) which had a height of approximately 10–30 cm were sprayed with the preparation of the active compound until dripping wet. These bean plants were heavily infested with all stages of development of the two-spotted spider mite (*Tetranychus urticae*).

After the specified periods of time, the effectiveness of the preparation of active compound was determined Table 2

Long-term action after spraying/0.05% by weight of active compound
(*Plutella maculipennis* on *Brassica oleracea*)

| Active compound | % destruction after | | | | | | | |
|---|---|---|---|---|---|---|---|---|
| | 4 | 8 | 11 | 15 | 18 | 22 | 25 | 29 days |
| 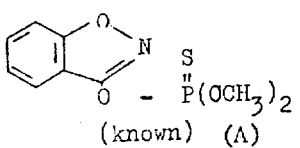 (known) (A) | 25 | 0 | | | | | | |
| 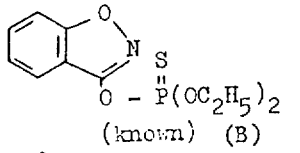 (known) (B) | 100 | 100 | 0 | | | | | |
| 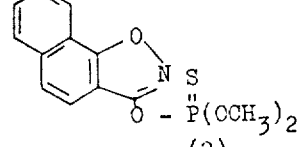 (2) | 100 | 100 | 100 | 80 | 100 | 80 | 20 | |
| 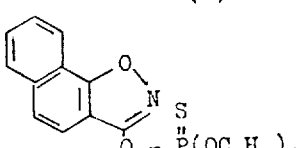 (1) | 100 | 100 | 100 | 100 | 100 | 95 | 100 | 90 |

EXAMPLE 3

Tetranychus test (resistant)
Solvent: 3 parts by weight of acetone
Emulsifier: 1 part by weight of alkylaryl polyglycol ether To produce a suitable preparation of active compound, 1 part by weight of active compound was mixed by counting the dead animals. The degree of destruction thus obtained was quoted in percent. 100 percent means that all the spider mites were killed and 0 percent means that none of the spider mites were killed.

The active compound, the concentration of the active compounds, the evaluation times and the results can be seen from the following Table 3:

Table 3

(Tetranychus test/resistant)

| Active compound | Active compound concentration in % by weight | Degree of destruction in % after 2 days |
|---|---|---|
| 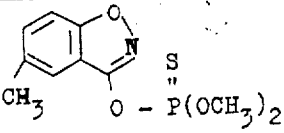 (known) (C) | 0.1 | 0 |

Table 3 (continued)

(Tetranychus test/resistant)

| Active compound | Active compound concentration in % by weight | Degree of destruction in % after 2 days |
|---|---|---|
| 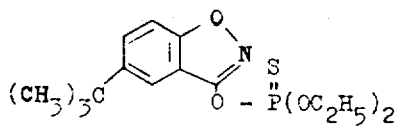 (known) (D) | 0.1 | 0 |
| 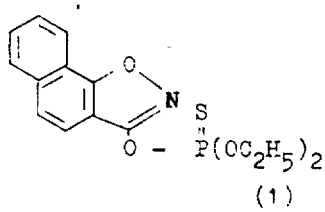 (1) | 0.1 | 98 |

EXAMPLE 4

$LD_{100}$ test
Test insects: *Sitophilus granarius*
Solvent: Acetone 2 parts by weight of the active compound were taken up in 1,000 parts by volume of solvent. The solution so obtained was diluted with further solvent to the desired concentrations.

2.5 ml of the solution of the active compound were pipetted into a Petri dish. On the bottom of the Petri dish there was a filter paper with a diameter of about 9.5 cm. The Petri dish remained uncovered until the solvent had completely evaporated. The amount of active compound per m² of filter paper varied with the concentration of the solution of the active compound. About 25 test insects were then placed in the Petri dish and it was covered with a glass lid.

The condition of the test insects was observed 3 days after the commencement of the experiments. The destruction in percent was determined.

The active compound, the concentrations of the active compounds, the test insects and the results can be seen from the following Table 4:

Table 4

($LD_{100}$ test/*Sitophilus granarius*)

| Active compound | Active compound concentration of the solution in % by weight | Destruction in % |
|---|---|---|
| (CH₃)₃C— ... O—P(OC₂H₅)₂ (known) (D) | 0.2 | 60 |
| ... O—P(OC₂H₅)₂ (1) | 0.2<br>0.02 | 100<br>100 |
| ... O—P(OCH₃)₂ (2) | 0.2<br>0.02 | 100<br>100 |

EXAMPLE 5

Mosquito larvae test
Test insects: *Aedes aegypti* larvae
Solvent: 99 parts by weight of acetone
Emulsifier: 1 part by weight of benzylhydroxydiphenyl polyglycol ether To produce a suitable preparation of active compound, 2 parts by weight of the active compound were dissolved in 1,000 parts by volume of the solvent containing the amount of emulsifier stated above. The solution thus obtained was diluted with water to the desired lower concentrations.

The aqueous preparations of the active compounds were placed in glass vessels and about 25 mosquito larvae were then placed in each glass vessel. After 24 hours the degree of destruction in percent was determined. Here 100 percent denotes that all larvae were destroyed, 0 percent denotes that none of the larvae were destroyed. The active compounds, the concentrations of the active compounds, the test insects and the results can be seen from the following Table 5:

EXAMPLE 6

Test with parasitic fly larvae
Solvent:
35 parts by weight of ethylene polyglycol monomethyl ether 35 parts by weight of nonylphenol polyglycol ether To prepare an appropriate preparation of the active compound, 30 parts by weight of the active substance in question were mixed with the stated amount of solvent, which contained the abovementioned proportion of emulsifier, and the concentrate thus obtained was diluted with water to the desired concentration.

About 20 fly larvae (*Lucilia cuprina*) were introduced into a test tube which contained approximately 2 cm³ of horse muscle. 0.5 ml of the active compound preparation was applied to this horse meat. After 24 hours, the degree of destruction in percent was determined. Here 100 percent denotes that all larvae were destroyed and 0 percent denotes that none of the larvae were destroyed.

Table 5

(Mosquito larvae test/*Aedes aegypti*)

| Active compound | Active compound concentration of the solution in ppm | Degree of destruction in % |
|---|---|---|
| (known) (C) | 10 | 100 |
| | 1 | 100 |
| | 0.1 | 60 |
| (known) (D) | 10 | 100 |
| | 1 | 80 |
| (1) | 10 | 100 |
| | 1 | 100 |
| | 0.1 | 100 |
| | 0.01 | 100 |
| | 0.001 | 30 |
| (2) | 10 | 100 |
| | 1 | 100 |
| | 0.1 | 100 |
| | 0.01 | 80 |

The active compound investigated, the concentrations thereof, the parasites tested and the findings obtained can be seen from the following Table 6:

Table 6

(Test with parasitic fly larvae)

| Active compound | Active compound concentration in ppm | Degree of destruction in % (Lucilia cuprina) |
| --- | --- | --- |
| (1) | 100<br>10<br>1 | 100<br>>50<br>0 |
| (2) | 100<br>30<br>10<br>3 | 100<br>100<br><50<br>0 |

Example 7

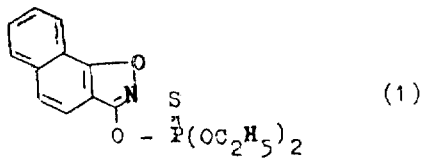

(1)

A mixture of 67 g (0.36 mole) of 3-hydroxy-naphth(2,1-d)-isoxazole in 350 ml of acetonitrile and 54 g (0.39 mole) of potassium carbonate was stirred for 30 minutes at 50°C and 57 g (0.3 mole) of O,O-diethyl-thionophosphoric acid ester chloride were then added dropwise at this temperature.

After stirring for three hours at 60°C, the reaction mixture was cooled and poured into water, and the oil which separated out was taken up in benzene. The batch was filtered, washed 3 times with 2 N sodium hydroxide solution and dried, and the solvent was distilled off under reduced pressure. The residue was freed of the volatile constituents and 55 g (54.5 percent of theory) of O,O-diethyl-O-[naphth(2,1-d)-isoxazol(3)yl]-thionophosphoric acid ester of refractive index $n_D^{21}$: 1.5805 were obtained. The initially oily product solidified to form crystals and after treatment with petroleum ether beige-colored crystals of melting point 48°C were obtained

EXAMPLE 8

The following compound was prepared analogously to the description in Example 7.

| Formula | Physical data (melting point) | Yield (% of theory) |
| --- | --- | --- |
| 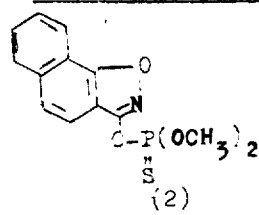 (2) | 69°C | 39 |

It will be appreciated that the instant specification and examples are set forth by way of illustration and not limitation, and that various modifications and changes may be made without departing from the spirit and scope of the present invention.

What is claimed is:
1. A naphthisoxazole-thionophosphoric acid ester of the formula

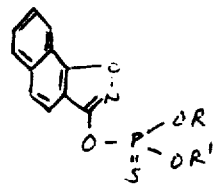

in which
R and R' each independently is alkyl of 1 to 6 carbon atoms.
2. A compound according to claim 1 in which R and R' each independently is alkyl of 1 to 4 carbon atoms.
3. A compound according to claim 1 wherein such compound is O,O-diethyl-O-[naphth(2,1-d)-isoxazol-(3)yl]-thionophosphoric acid ester of the formula
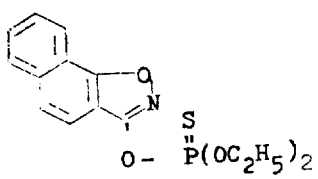
4. The compound according to claim 1 wherein such compound is O,O-dimethyl-O-[naphth(2,1-d)-isoxazol-(3)yl]-thionophosphoric acid ester of the formula
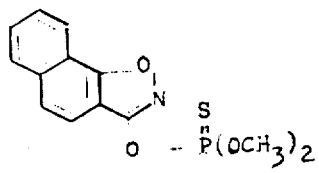
* * * * *